(12) United States Patent
Anantaraman et al.

(10) Patent No.: US 11,249,910 B2
(45) Date of Patent: Feb. 15, 2022

(54) INITIALIZATION AND MANAGEMENT OF CLASS OF SERVICE ATTRIBUTES IN RUNTIME TO OPTIMIZE DEEP LEARNING TRAINING IN DISTRIBUTED ENVIRONMENTS

(71) Applicant: Intel Corporation, Santa Clara, CA (US)

(72) Inventors: Aravindh Anantaraman, Folsom, CA (US); Srinivas Sridharan, Bangalore (IN); Ajaya Durg, Austin, TX (US); Mohammad R. Haghighat, San Jose, CA (US); Mikhail E. Smorkalov, Nizhniy Novgorod (RU); Sudarshan Srinivasan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 16/717,647

(22) Filed: Dec. 17, 2019

(65) Prior Publication Data
US 2020/0125499 A1 Apr. 23, 2020

(51) Int. Cl.
*G06F 12/08* (2016.01)
*G06F 3/06* (2006.01)
*G06F 12/0868* (2016.01)
*G06F 12/10* (2016.01)
*G06F 16/2455* (2019.01)
*G06N 3/08* (2006.01)
(Continued)

(52) U.S. Cl.
CPC .......... *G06F 12/0868* (2013.01); *G06F 3/061* (2013.01); *G06F 3/067* (2013.01); *G06F 3/0611* (2013.01); *G06F 3/0656* (2013.01); *G06F 12/0871* (2013.01); *G06F 12/0877* (2013.01); *G06F 12/10* (2013.01); *G06F 16/2455* (2019.01); *G06N 3/08* (2013.01); *G06F 2212/7203* (2013.01)

(58) Field of Classification Search
CPC .... G06F 3/0656; G06F 13/1673; G06F 21/52; G06F 2205/063; G06F 2205/066; G06F 2213/2806; G06F 3/061; G06F 3/0611; G06F 3/0613; G06F 12/0868; G06F 12/0871; G06F 12/0877; G06F 2212/6022; G06F 2212/7203; G06F 3/067
See application file for complete search history.

(56) References Cited

U.S. PATENT DOCUMENTS 8,516,578 B1 * 8/2013 Tavares .................. G06F 21/52
726/22
10,236,031 B1 * 3/2019 Gurijala ............... G11B 27/323
(Continued)

OTHER PUBLICATIONS

Understanding Class of Service (CoS) Profiles by Jupiter (Year: 2017).*
(Continued)

*Primary Examiner* — Paul M Knight
(74) *Attorney, Agent, or Firm* — Jordan IP Law, LLC

(57) ABSTRACT

Systems, apparatuses and methods may provide for technology that detects a runtime call to a communication library, wherein the runtime call identifies a memory buffer, determines that a class of service (CLOS) attribute is associated with the memory buffer, and issues a driver instruction to modify the CLOS attribute in response to the runtime call.

24 Claims, 7 Drawing Sheets

(51) Int. Cl.
  *G06F 12/0877* (2016.01)
  *G06F 12/0871* (2016.01)

(56) References Cited

U.S. PATENT DOCUMENTS

| | | | | |
|---|---|---|---|---|
| 10,628,280 | B1* | 4/2020 | Reeves | G06F 11/3476 |
| 2009/0182945 | A1* | 7/2009 | Aviles | H04L 67/1097 |
| | | | | 711/122 |
| 2013/0121183 | A1* | 5/2013 | Pope | H04L 29/06 |
| | | | | 370/252 |
| 2013/0204965 | A1* | 8/2013 | Masputra | H04L 47/60 |
| | | | | 709/217 |
| 2013/0227201 | A1* | 8/2013 | Talagala | G06F 3/0679 |
| | | | | 711/103 |
| 2015/0282026 | A1* | 10/2015 | Gupta | H04W 48/16 |
| | | | | 370/331 |
| 2016/0147559 | A1* | 5/2016 | Weimer | G06F 9/461 |
| | | | | 712/228 |
| 2019/0042124 | A1* | 2/2019 | Doshi | G06F 3/0656 |

OTHER PUBLICATIONS

Buffer Occupancy-Based Transport to Reduce Flow Completion Time of Short Flows in Data Center Networks by Ahmed (Year: 2019).*
Adaptive Self-Tuning Memory in DB2 by Storm (Year: 2006).*
Y. Ueno, "Technologies behind Distributed Deep Learning: AllReduce," <tech preferred.jp/en/blog/technologies-behind-distributed-deep-learning-allreduce>, retrieved Nov. 29, 2019, 11 pages.

* cited by examiner

INITIALIZATION AND MANAGEMENT OF CLASS OF SERVICE ATTRIBUTES IN RUNTIME TO OPTIMIZE DEEP LEARNING TRAINING IN DISTRIBUTED ENVIRONMENTS

TECHNICAL FIELD

Embodiments generally relate to class of service (CLOS) attributes. More particularly, embodiments relate to the initialization and management of CLOS attributes in runtime to optimize deep learning training in distributed environments.

BACKGROUND

Some graphics processing units (GPUs) may permit application developers to statically set, during buffer allocation, the class of service (CLOS) for pages of memory that will be used during execution of the application. The CLOS may then be used to control the cacheability of information on a per-page basis. Statically setting the CLOS during buffer allocation at the page level may be inefficient. Indeed, conventional solutions may result in suboptimal performance, particularly when the application involves training a deep neural network having a relatively intensive communication workload.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
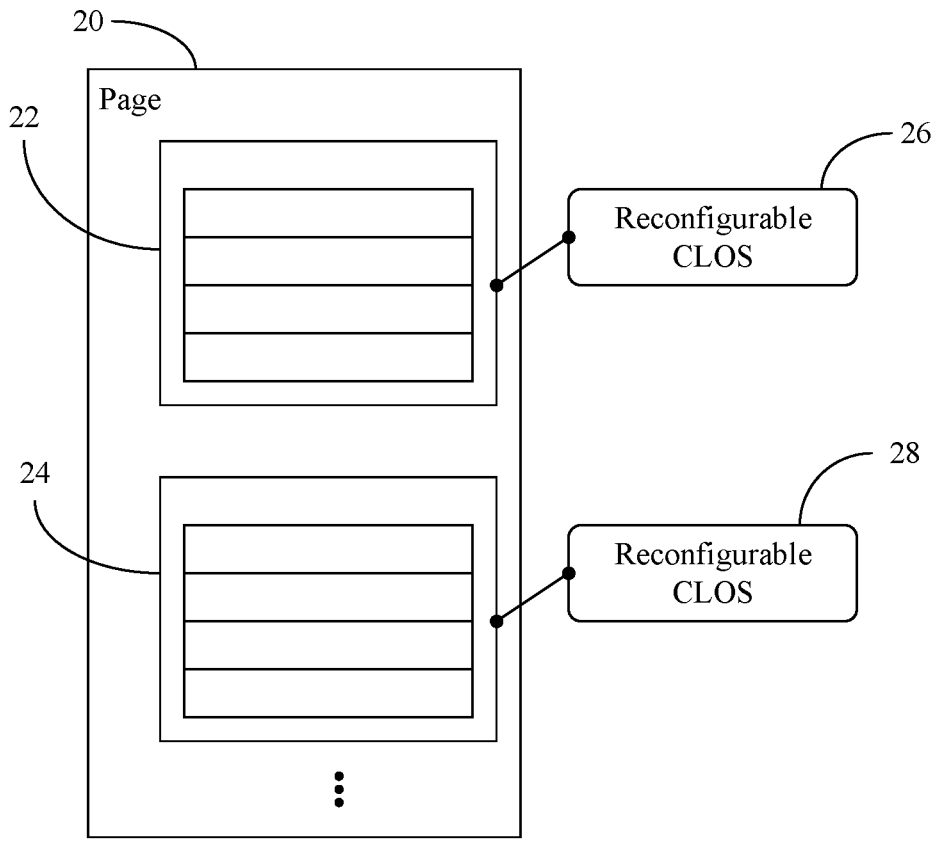
FIG. 1 is an illustration of an example of reconfigurable class of service attributes that are managed a sub-page level according to an embodiment.

Turning now to FIG. 1, a memory page 20 (e.g., fixed-length contiguous block of virtual memory, described by a single entry in a page table) is shown, where the memory page 20 includes a first address range 22, a second address range 24, and so forth. In the illustrated example, a first class of service (CLOS) attribute 26 is associated with the first address range 22 and a second CLOS 28 is associated with the second address range 24. In an embodiment, the first address range 22 is used as a first memory buffer and the second address range 24 is used as a second memory buffer. When an application such as, for example, a deep learning (DL) application allocates the first memory buffer to a first workload, the application may also associate, dedicate and/or assign the first CLOS attribute 26 to the first address range 22 based on the type of workload.

For example, if it is determined at allocation time that the first workload is expected to be a compute kernel (e.g., software routine dedicated to matrix-matrix multiplication operations or convolution operations), a DL application might select a relatively low value for the first CLOS attribute 26. Similarly, if it is determined at allocation time that a second workload is expected to be a communication kernel (e.g., software routine dedicated to communications across tiles within a multi-tile GPU package, across GPU packages via scale-up links, etc., in a distributed environment), the DL application may select a relatively high value for the second CLOS attribute 28. If the CLOS attributes 26, 28 are proportional to cacheability, the selected values will cause less cache memory to be allotted for the information in the first address range 22 than the second address range 24. In this regard, it has been determined that, for example, an "allreduce" communication operation (e.g., that computes a gradient of a loss function on each GPU, computes the mean of the gradients by inter-GPU communication, and updates the network model), competes significantly for the same resources as compute kernels. Thus, the illustrated CLOS attributes 26, 28 may afford the application with more flexibility in managing performance and better scalability.

Indeed, the illustrated CLOS attributes 26, 28 are reconfigurable, which may further enhance efficiency, performance and/or scalability. In this regard, the address ranges 22, 24 may be reused (e.g., during iterative training) for different workloads during execution of the application. Thus, if the first address range 22 (e.g., first memory buffer) is subsequently allocated to a third workload that is a communication kernel, the first CLOS attribute 26 may be set (e.g., via an instruction issued from a communication library) to a relatively high value at runtime. Thus, even greater flexibility may be achieved with regard to performance. Moreover, setting the CLOS attributes 26, 28 at a level of granularity that is less than the page 20 further tailors the illustrated solution to the operation of the application, which allocates memory at the buffer level.

Figure 2:
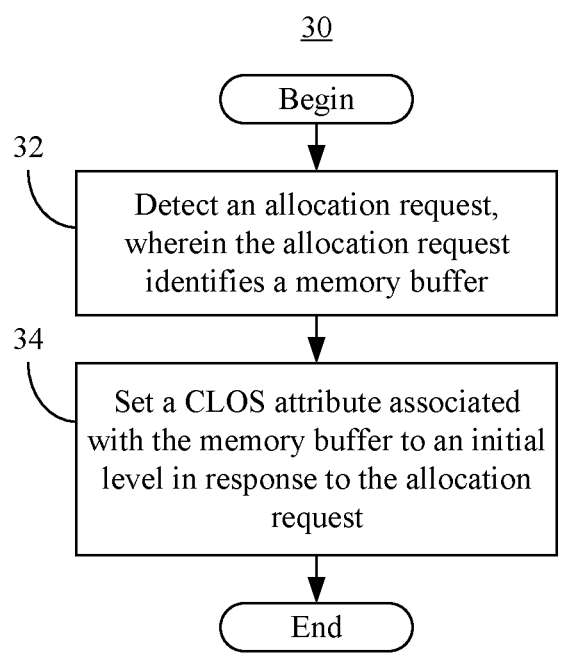
FIG. 2 is a flowchart of an example of a method of initializing a class of service attribute according to an embodiment.

FIG. 2 shows a method 30 of initializing a CLOS attribute. The method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for detecting an allocation request, wherein the allocation request identifies a memory buffer. In an embodiment, the allocation request identifies the memory buffer by an address range (e.g., in virtual memory). Block 34 sets a CLOS attribute associated with the memory buffer to an initial level in response to the allocation request. Block 34 may set the CLOS attribute to a default level or a level corresponding to the expected type of workload for the memory buffer. The method 30 therefore enhances performance by initializing CLOS attributes on a per memory buffer basis (e.g., rather than a per page basis).

Figure 3:
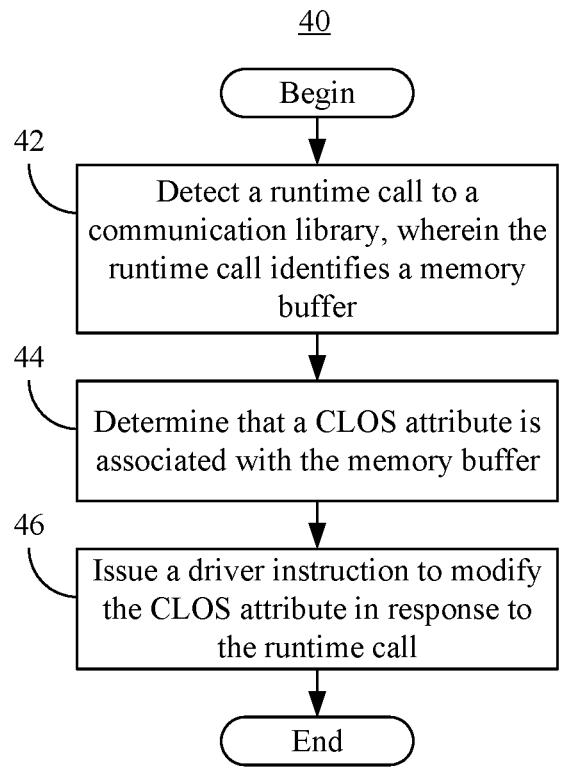
FIG. 3 is a flowchart of an example of a method of adjusting a class of service attribute according to an embodiment.

FIG. 3 shows a method 40 of adjusting a CLOS attribute. The method 40 may be implemented subsequent to the method 30 (FIG. 2) in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 42 detects a runtime call (e.g., ccl_allreduce during a training iteration) to a communication library, wherein the runtime call identifies a memory buffer. In one example, the memory buffer is identified by an address range. Block 44 determines that a CLOS attribute is associated with the memory buffer. In an embodiment, block 44 includes searching a data structure (e.g., map) for an address range corresponding to the memory buffer. As already noted, the address range may be smaller than the size of a memory page. Block 46 issues a driver instruction to modify the CLOS attribute in response to the runtime call. In one example, the driver instruction requests an increase in a level of the CLOS attribute if the runtime call is associated with a communication kernel. In another example, the driver instruction requests a decrease in a level of the CLOS attribute if the runtime call is associated with a compute kernel. Block 46 may also include storing the previous value of the CLOS attribute to a suitable memory location (e.g., register). The illustrated method 40 therefore enhances performance and/or scalability at least by 1) using a driver instruction to modify the CLOS attribute, 2) at runtime, and 3) on a per memory buffer basis.

Figure 4:
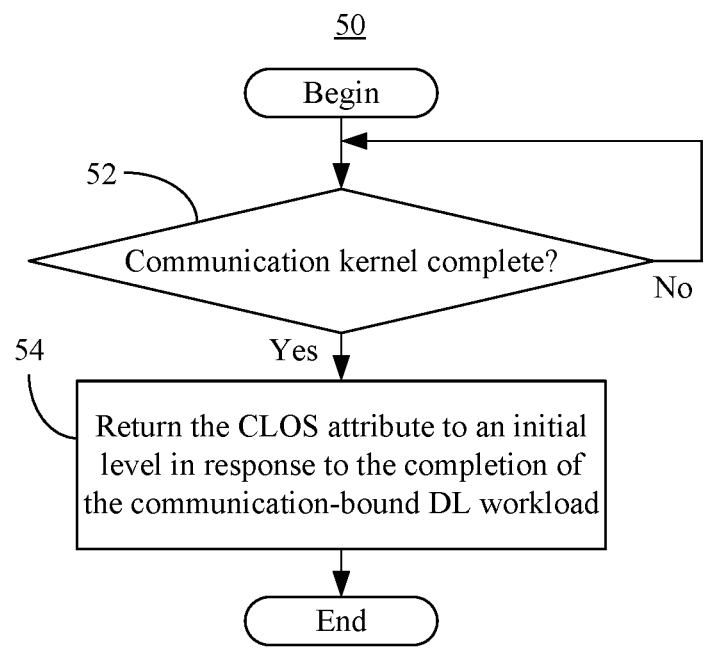
FIG. 4 is a flowchart of an example of another method of adjusting a class of service attribute according to an embodiment.

FIG. 4 shows another method 50 of adjusting a CLOS attribute. The method 50 might be implemented subsequent to the method 40 (FIG. 3, e.g., after increasing a CLOS attribute to support a communication kernel) in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 52 provides for determining whether a communication kernel is complete. If not, the illustrated method 50 enters a wait state. Once the communication kernel is complete, block 54 returns the CLOS attribute to an initial level in response to completion of the workload. In an embodiment, block 54 includes retrieving the value of the initial level from a suitable memory location (e.g., register). The illustrated method 50 therefore further enhances performance and/or scalability by providing the ability temporarily adjust CLOS attributes based on runtime conditions.

Figure 5:
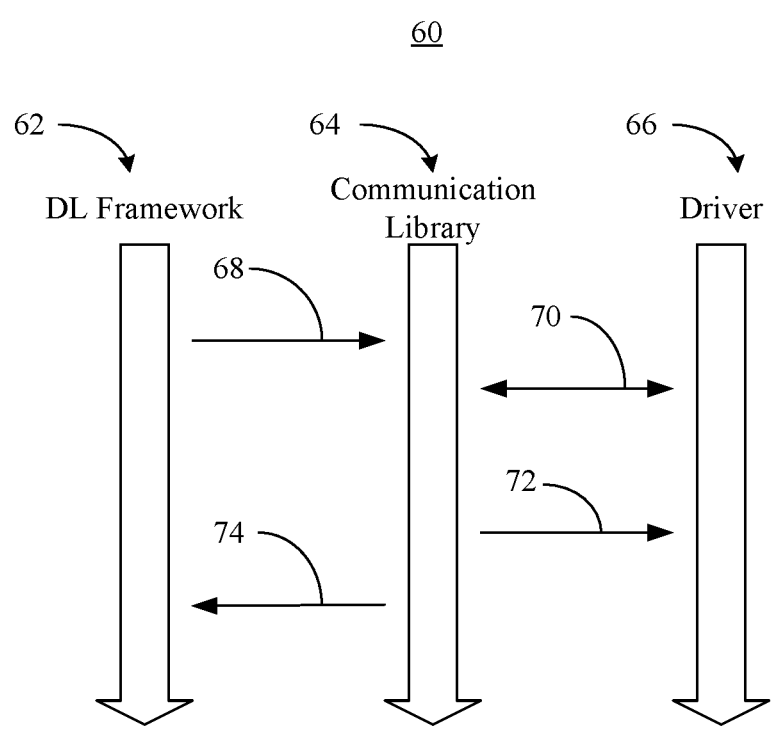
FIG. 5 is a signaling diagram of an example of communications between a deep learning (DL) framework, a communication library and a driver according to an embodiment.

FIG. 5 shows a signaling diagram 60 for communications between a DL framework 62, a communication library 64 (e.g., ONEAPI Collective Communications Library/oneCCL), and a driver 66. In the illustrated example, the DL framework 62 issues a runtime call 68 (e.g., ccl_allreduce) to the communication library 64. The runtime call 68 may include a buffer address, size, and so forth. In an embodiment, the communication library 64 issues a driver instruction (e.g., through additional middleware and/or an application programming interface/API), which requests a change to the CLOS attribute for the memory region of interest. As already noted, the change may be to a relatively low CLOS value for compute kernels, a relatively high CLOS value for communication kernels, and so forth. The communication library 64 may also store the previous CLOS value for the memory region and start the communication operation. Once communication is completed, the illustrated communication library 64 recovers the previous CLOS value for the memory region via another driver instruction 72. In an embodiment, the communication library 64 then sends a notification 74 to the DL framework 62 that the communication has completed. Upon receipt of the notification 74, the DL framework 62 may begin using the memory buffer for other purposes.

Figure 6:
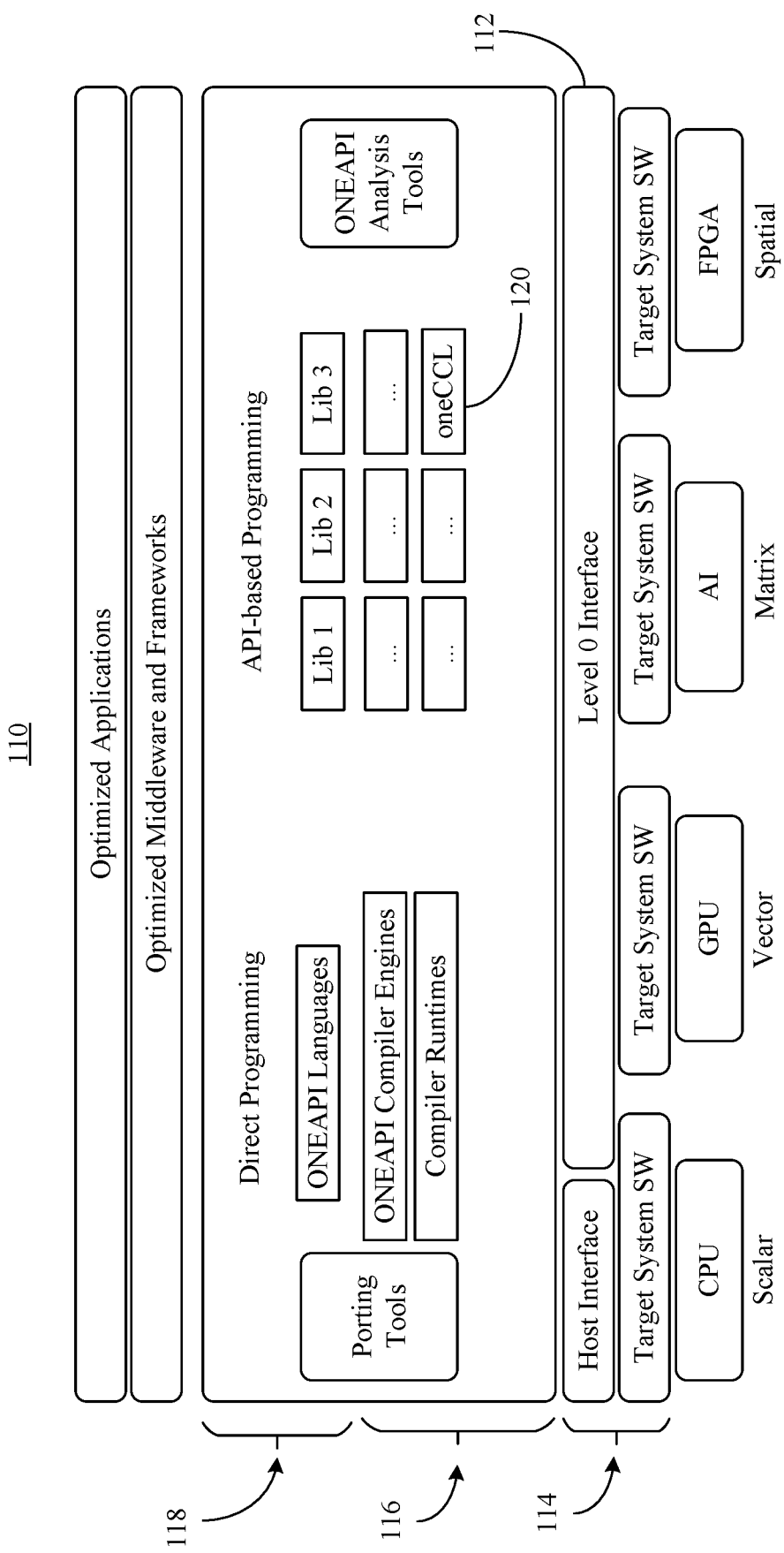
FIG. 6 is a block diagram of an example of a software stack according to an embodiment.

FIG. 6 shows a unified software stack 110 that includes a level 0 interface 112, system software 114 below the level 0 interface 112, system software 116 above the level 0 interface 112, and a developer interface 118. The system software 114 below the level 0 interface 112 communicates with hardware such as, for example, a CPU (e.g., which might support scalar operations), a GPU (e.g., which may support vector operations), an AI (artificial intelligence) accelerator (e.g., which might support matrix operations), and an FPGA (e.g., which may support spatial operations). Additionally, the developer interface 118 interacts with optimized middleware and associated frameworks, which in turn support one or more optimized applications. In an embodiment, a library 120 such as, for example, a (ONEAPI Collective Communications Library/oneCCL), includes the functionality of the method 30 (FIG. 2), the method 40 (FIG. 3) and/or the method 50 (FIG. 4), already discussed.

Figure 7:
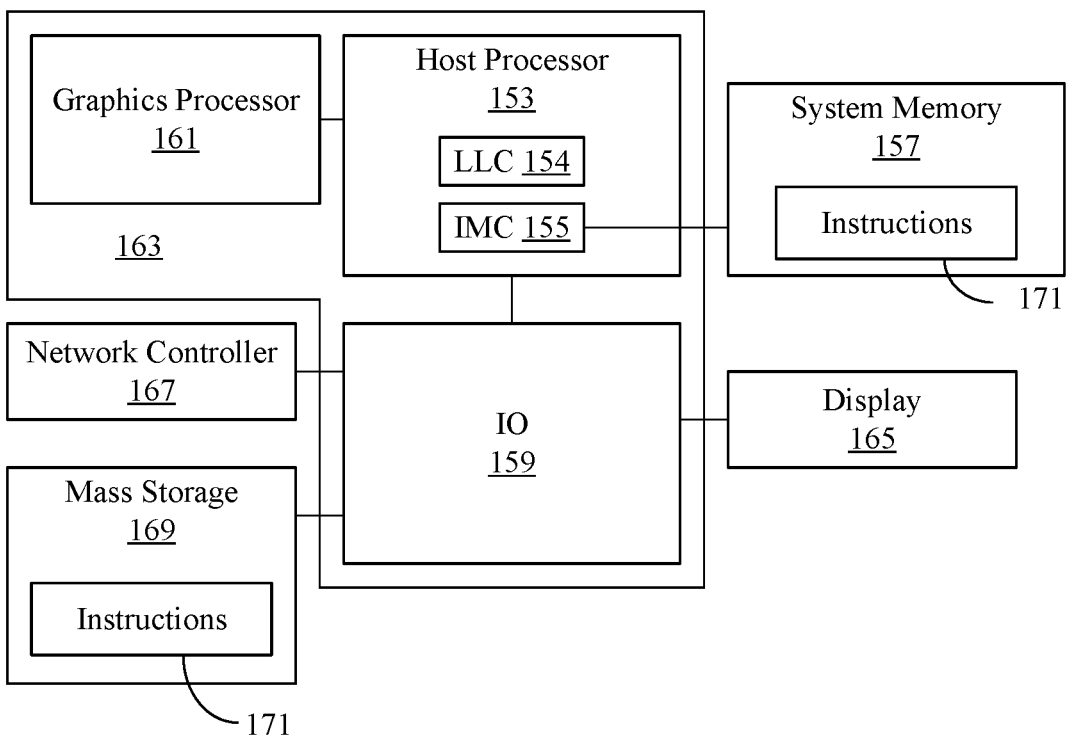
FIG. 7 is a block diagram of an example of a performance-enhanced computing system according to an embodiment.

Turning now to FIG. 7, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 151 includes a host processor 153 (e.g., CPU with a plurality of cores) having a last level cache (LLC, e.g., level 3/L3 cache) 154 and an integrated memory controller (IMC) 155 that is coupled to a system memory 157.

The illustrated system 151 also includes an input output (IO) module 159 implemented together with the host processor 153 and a graphics processor 161 on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory).

In an embodiment, the host processor 153, the graphics processor 161 and/or the IO module 159 execute program instructions 171 retrieved from the system memory 157 and/or the mass storage 169 to perform one or more aspects of the method 30 (FIG. 2), the method 40 (FIG. 3) and/or the method 50 (FIG. 4), already discussed. Thus, execution of the illustrated instructions may cause the computing system to detect a runtime call to a communication library, wherein the runtime call identifies a memory buffer, determine that a CLOS attribute is associated with the memory buffer, and issue a driver instruction to modify the CLOS attribute in response to the runtime call. In an embodiment, to determine that the CLOS attribute is associated with the memory buffer, the instructions 171, when executed, cause the computing system 151 to search a data structure for an address range corresponding to the memory buffer. In one example, the address range is smaller than a memory page. The computing system 151 is therefore performance-enhanced at least to the extent that it uses a driver instruction to modify the CLOS attribute at runtime and on a per memory buffer basis.

Figure 8:
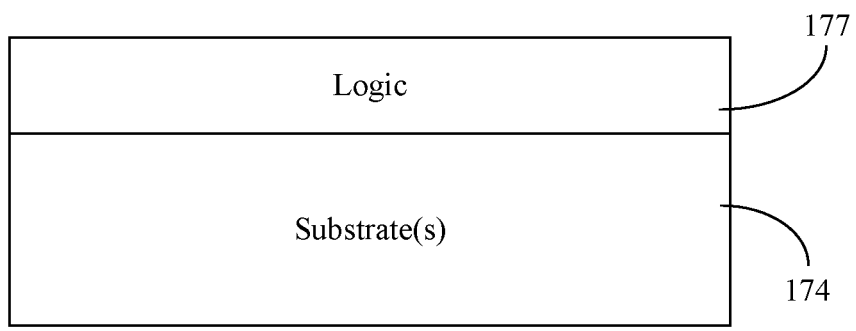
FIG. 8 is an illustration of an example of a semiconductor apparatus according to an embodiment.

FIG. 8 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 30 (FIG. 2), the method 40 (FIG. 3) and/or the method 50 (FIG. 4), already discussed. Thus, the logic 177 may detect a runtime call to a communication library, wherein the runtime call identifies a memory buffer, determine that a CLOS attribute is associated with the memory buffer, and issue a driver instruction to modify the CLOS attribute in response to the runtime call. In an embodiment, to determine that the CLOS attribute is associated with the memory buffer, the logic 177 searches a data structure for an address range corresponding to the memory buffer. In one example, the address range is smaller than a memory page. The apparatus 173 is therefore performance-enhanced at least to the extent that it uses a driver instruction to modify the CLOS attribute at runtime and on a per memory buffer basis.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 9:
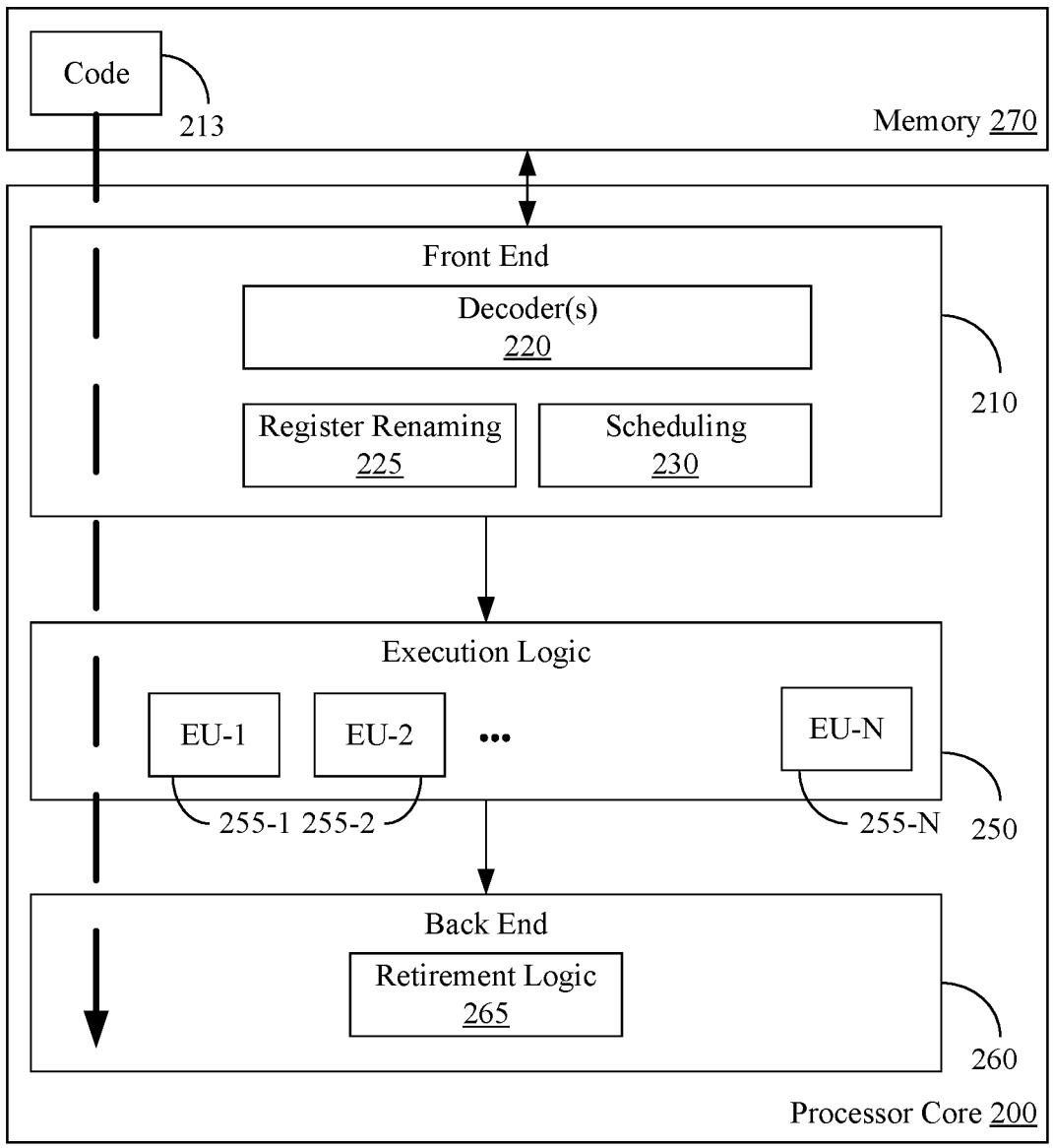
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 2), the method 40 (FIG. 3) and/or the method 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
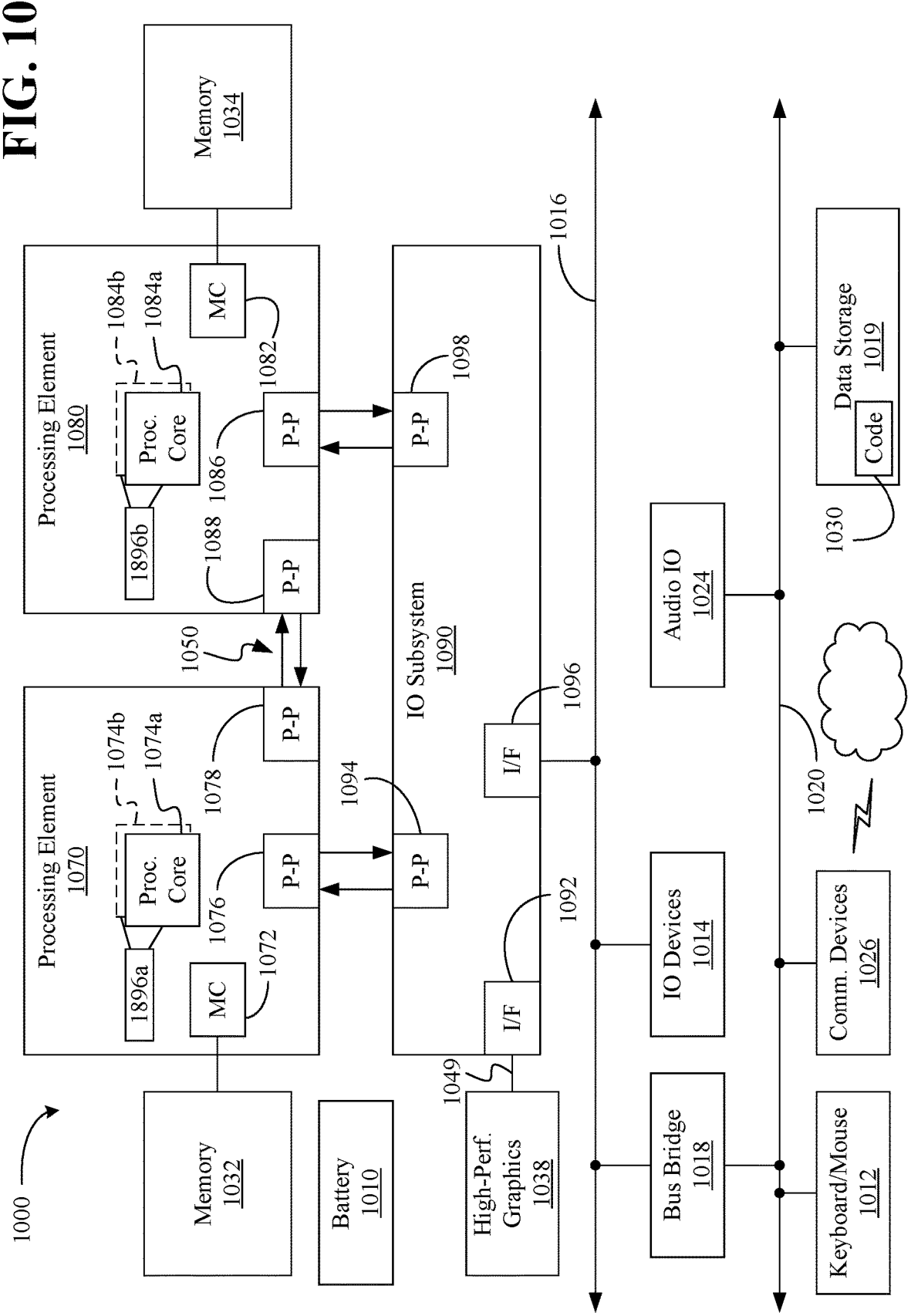
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 30 (FIG. 2), the method 40 (FIG. 3) and/or the method 50 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes a performance-enhanced computing system comprising a network controller, a processor coupled to the network controller, and a memory coupled to the processor, wherein the memory includes a set of executable program instructions, which when executed by the processor, cause the computing system to detect a runtime call to a communication library, wherein the runtime call identifies a memory buffer, determine that a class of service (CLOS) attribute is associated with the memory buffer, and issue a driver instruction to modify the CLOS attribute in response to the runtime call.

Example 2 includes the computing system of Example 1, wherein to determine that the CLOS attribute is associated with the memory buffer, the instructions, when executed, cause the computing system to search a data structure for an address range corresponding to the memory buffer, and wherein the address range is smaller than a memory page.

Example 3 includes the computing system of Example 1, wherein the driver instruction is to request an increase in a level of the CLOS attribute if the runtime call is associated with a communication kernel.

Example 4 includes the computing system of Example 3, wherein the instructions, when executed, further cause the computing system to return the CLOS attribute to an initial level in response to a completion of the communication kernel.

Example 5 includes the computing system of Example 1, wherein the driver instruction is to request a decrease in a level of the CLOS attribute if the runtime call is associated with a compute kernel.

Example 6 includes the computing system of any one of Examples 1 to 5, wherein the instructions, when executed, further cause the computing system to detect an allocation request, wherein the allocation request identifies the memory buffer, and set the CLOS attribute to an initial level in response to the allocation request.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a runtime call to a communication library, wherein the runtime call identifies a memory buffer, determine that a class of service (CLOS) attribute is associated with the memory buffer, and issue a driver instruction to modify the CLOS attribute in response to the runtime call.

Example 8 includes the semiconductor apparatus of Example 7, wherein to determine that the CLOS attribute is associated with the memory buffer, the logic coupled to the one or more substrates is to search a data structure for an address range corresponding to the memory buffer, and wherein the address range is smaller than a memory page.

Example 9 includes the semiconductor apparatus of Example 7, wherein the driver instruction is to request an increase in a level of the CLOS attribute if the runtime call is associated with a communication kernel.

Example 10 includes the semiconductor apparatus of Example 9, wherein the logic coupled to the one or more substrates is to return the CLOS attribute to an initial level in response to a completion of the communication kernel.

Example 11 includes the semiconductor apparatus of Example 7, wherein the driver instruction is to request a decrease in a level of the CLOS attribute if the runtime call is associated with a compute kernel.

Example 12 includes the semiconductor apparatus of any one of Examples 7 to 11, wherein the logic coupled to the one or more substrates is to detect an allocation request, wherein the allocation request identifies the memory buffer, and set the CLOS attribute to an initial level in response to the allocation request.

Example 13 includes at least one computer readable storage medium comprising a set of executable program instructions, which when executed by a computing system, cause the computing system to detect a runtime call to a communication library, wherein the runtime call identifies a memory buffer, determine that a class of service (CLOS) attribute is associated with the memory buffer, and issue a driver instruction to modify the CLOS attribute in response to the runtime call.

Example 14 includes the at least one computer readable storage medium of Example 13, wherein to determine that the CLOS attribute is associated with the memory buffer, the instructions, when executed, cause the computing system to search a data structure for an address range corresponding to the memory buffer, and wherein the address range is smaller than a memory page.

Example 15 includes the at least one computer readable storage medium of Example 13, wherein the driver instruction is to request an increase in a level of the CLOS attribute if the runtime call is associated with a communication kernel.

Example 16 includes the at least one computer readable storage medium of Example 15, wherein the instructions, when executed, further cause the computing system to return the CLOS attribute to an initial level in response to a completion of the communication kernel.

Example 17 includes the at least one computer readable storage medium of Example 13, wherein the driver instruction is to request a decrease in a level of the CLOS attribute if the runtime call is associated with a compute kernel.

Example 18 includes the at least one computer readable storage medium of any one of Examples 13 to 17, wherein the instructions, when executed, further cause the computing system to detect an allocation request, wherein the allocation request identifies the memory buffer, and set the CLOS attribute to an initial level in response to the allocation request.

Example 19 includes a method of operating a performance-enhanced computing system, the method comprising detecting a runtime call to a communication library, wherein the runtime call identifies a memory buffer, determining that a class of service (CLOS) attribute is associated with the memory buffer, and issuing a driver instruction to modify the CLOS attribute in response to the runtime call.

Example 20 includes the method of Example 19, wherein determining that the CLOS attribute is associated with the memory buffer includes searching a data structure for an address range corresponding to the memory buffer, and wherein the address range is smaller than a memory page.

Example 21 includes the method of Example 19, wherein the driver instruction requests an increase in a level of the CLOS attribute if the runtime call is associated with a communication kernel.

Example 22 includes the method of Example 21, further including returning the CLOS attribute to an initial level in response to a completion of the communication kernel.

Example 23 includes the method of Example 19, wherein the driver instruction requests a decrease in a level of the CLOS attribute if the runtime call is associated with a compute kernel.

Example 24 includes the method of any one of Examples 19 to 23, further including detecting an allocation request, wherein the allocation request identifies the memory buffer, and setting the CLOS attribute to an initial level in response to the allocation request.

Example 25 includes means for performing the method of any one of Examples 19 to 24.

Thus, technology described herein uses instruction-based setting of CLOS attributes to enable communication libraries to choose which buffers will have these attributes. The technology also enables the library to increase or decrease the CLOS priority based on runtime behavior. Accordingly, a mechanism to trade-off between compute and communication performance is achieved. Indeed, the capability to fine-tune the training of DL workloads may be particularly advantageous.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and
a memory coupled to the processor, wherein the memory includes a set of executable program instructions, which when executed by the processor, cause the computing system to:
detect a runtime call to a communication library, wherein the runtime call identifies a memory buffer;
determine that a class of service (CLOS) attribute is associated with the memory buffer, and
issue a driver instruction to modify the CLOS attribute in response to the runtime call;
wherein the CLOS attribute associated with the memory buffer is reconfigurable and is based on a type of workload to which the memory buffer is allocated.

2. The computing system of claim 1, wherein to determine that the CLOS attribute is associated with the memory buffer, the instructions, when executed, cause the computing system to search a data structure for an address range corresponding to the memory buffer, and wherein the address range is smaller than a memory page.

3. The computing system of claim 1, wherein the driver instruction is to request an increase in a level of the CLOS attribute if the runtime call is associated with a communication kernel.

4. The computing system of claim 3, wherein the instructions, when executed, further cause the computing system to return the CLOS attribute to an initial level in response to a completion of the communication kernel.

5. The computing system of claim 1, wherein the driver instruction is to request a decrease in a level of the CLOS attribute if the runtime call is associated with a compute kernel.

6. The computing system of claim 1, wherein the instructions, when executed, further cause the computing system to:
detect an allocation request, wherein the allocation request identifies the memory buffer; and
set the CLOS attribute to an initial level in response to the allocation request.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
detect a runtime call to a communication library, wherein the runtime call identifies a memory buffer;
determine that a class of service (CLOS) attribute is associated with the memory buffer; and
issue a driver instruction to modify the CLOS attribute in response to the runtime call;
wherein the CLOS attribute associated with the memory buffer is reconfigurable and is based on a type of workload to which the memory buffer is allocated.

8. The semiconductor apparatus of claim 7, wherein to determine that the CLOS attribute is associated with the memory buffer, the logic coupled to the one or more substrates is to search a data structure for an address range corresponding to the memory buffer, and wherein the address range is smaller than a memory page.

9. The semiconductor apparatus of claim 7, wherein the driver instruction is to request an increase in a level of the CLOS attribute if the runtime call is associated with a communication kernel.

10. The semiconductor apparatus of claim 9, wherein the logic coupled to the one or more substrates is to return the CLOS attribute to an initial level in response to a completion of the communication kernel.

11. The semiconductor apparatus of claim 7, wherein the driver instruction is to request a decrease in a level of the CLOS attribute if the runtime call is associated with a compute kernel.

12. The semiconductor apparatus of claim 7, wherein the logic coupled to the one or more substrates is to:
detect an allocation request, wherein the allocation request identifies the memory buffer; and
set the CLOS attribute to an initial level in response to the allocation request.

13. At least one computer readable storage medium comprising a set of executable program instructions, which when executed by a computing system, cause the computing system to:
detect a runtime call to a communication library, wherein the runtime call identifies a memory buffer;
determine that a class of service (CLOS) attribute is associated with the memory buffer; and
issue a driver instruction to modify the CLOS attribute in response to the runtime call;
wherein the CLOS attribute associated with the memory buffer is reconfigurable and is based on a type of workload to which the memory buffer is allocated.

14. The at least one computer readable storage medium of claim 13, wherein to determine that the CLOS attribute is associated with the memory buffer, the instructions, when executed, cause the computing system to search a data structure for an address range corresponding to the memory buffer, and wherein the address range is smaller than a memory page.

15. The at least one computer readable storage medium of claim 13, wherein the driver instruction is to request an increase in a level of the CLOS attribute if the runtime call is associated with a communication kernel.

16. The at least one computer readable storage medium of claim 15, wherein the instructions, when executed, further cause the computing system to return the CLOS attribute to an initial level in response to a completion of the communication kernel.

17. The at least one computer readable storage medium of claim 13, wherein the driver instruction is to request a decrease in a level of the CLOS attribute if the runtime call is associated with a compute kernel.

18. The at least one computer readable storage medium of claim 13, wherein the instructions, when executed, further cause the computing system to:
  detect an allocation request, wherein the allocation request identifies the memory buffer; and
  set the CLOS attribute to an initial level in response to the allocation request.

19. A method comprising:
  detecting a runtime call to a communication library, wherein the runtime call identifies a memory buffer;
  determining that a class of service (CLOS) attribute is associated with the memory buffer; and
  issuing a driver instruction to modify the CLOS attribute in response to the runtime call;
  wherein the CLOS attribute associated with the memory buffer is reconfigurable and is based on a type of workload to which the memory buffer is allocated.

20. The method of claim 19, wherein determining that the CLOS attribute is associated with the memory buffer includes searching a data structure for an address range corresponding to the memory buffer, and wherein the address range is smaller than a memory page.

21. The method of claim 19, wherein the driver instruction requests an increase in a level of the CLOS attribute if the runtime call is associated with a communication kernel.

22. The method of claim 21, further including returning the CLOS attribute to an initial level in response to a completion of the communication kernel.

23. The method of claim 19, wherein the driver instruction requests a decrease in a level of the CLOS attribute if the runtime call is associated with a compute kernel.

24. The method of claim 19, further including:
  detecting an allocation request, wherein the allocation request identifies the memory buffer; and
  setting the CLOS attribute to an initial level in response to the allocation request.

* * * * *